July 5, 1966
R. C. DEEGAN
3,258,959
THRUST MEASURING SYSTEMS
Filed Oct. 14, 1963
5 Sheets-Sheet 1
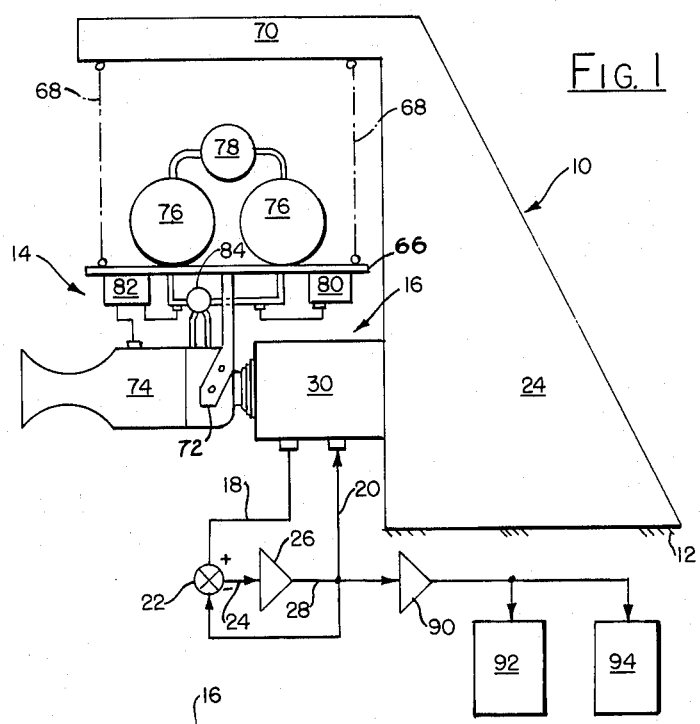
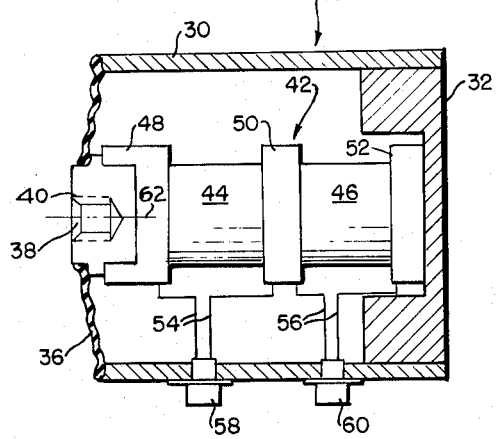
INVENTOR.
RICHARD C. DEEGAN
BY
*Beau, Brooks, Buckley + Beau.*
ATTORNEYS July 5, 1966 R. C. DEEGAN 3,258,959
THRUST MEASURING SYSTEMS
Filed Oct. 14, 1963 5 Sheets-Sheet 2

*INVENTOR.*
RICHARD C. DEEGAN
BY
*Beau, Brooks, Buckley, & Beau.*
ATTORNEYS

July 5, 1966  R. C. DEEGAN  3,258,959
THRUST MEASURING SYSTEMS
Filed Oct. 14, 1963  5 Sheets-Sheet 3

INVENTOR.
RICHARD C. DEEGAN
BY
Beau, Brooks, Buckley, + Beau,
ATTORNEYS

United States Patent Office 3,258,959
Patented July 5, 1966

3,258,959
THRUST MEASURING SYSTEMS
Richard C. Deegan, Buffalo, N.Y., assignor to Bell
Aerospace Corporation, Wheatfield, N.Y.
Filed Oct. 14, 1963, Ser. No. 315,801
5 Claims. (Cl. 73—116)

This invention relates to measuring devices and pertains, more particularly, to devices capable of making accurate measurements of transient forces.

Devices for measuring the magnitude of a force normally involve movement of the force-applying member incidental to the measuring process. A simple example is exhibited in the case of a platform scale; a weight (the force-applying member) is placed upon the scale platform whereupon the weight moves downwardly and depresses the platform until an equilibrium condition is reached, there being some definite and finite movement of the weight incidental to the attainment of such equilibrium conditions. The same situation prevails in the case of more exotic measuring devices such as strain gauges, piezoelectric devices, magnetostrictive devices, and the like; some movement of the force-applying member is involved in conjunction with the measuring operation. However, under some circumstances, movement of the force-applying member may give rise to inaccurate measurement. Such a condition could prevail, for example, if the applied force were of small time duration such that the applied force could be absorbed wholly or in part by inertia incidental to movement of the force-applying member. That is to say, the inertia of the system involved may be such that a momentarily applied force may be largely if not wholly absorbed by such inertia, giving rise to a grossly inaccurate measurement. It is, therefore, of primary concern in connection with this invention, to provide an improved force measuring device which is devoid of the above disadvantage, that is, which is free or substantially free of inaccuracies incidental to inertia phenomena.

Essentially, the present invention is characterized by a system having two basic components; one which produces an output proportional to a thrust-induced dimensional change along a given axis; and the other of which has an input for producing a dimensional change along the given axis which is in opposition to and capable of cancellation of the dimensional change of the first component. Thus, it is an object of this invention to provide a force measuring device having zero compliance in response to forces applied thereto so that the system operates under a condition of no net movement along the axis of force application, thus obviating errors due to inertia effects.

More particularly, it is an object of this invention to provide a force measuring device as aforesaid wherein a thrust producing assembly is suspended with one degree of freedom and in engagement with a measuring device having its sensitive axis coinciding with the axis defining the degree of freedom of the thrust producing assembly and with the measuring device, in turn, reacting against a substantially immovable thrust butt; all to the end of accurately measuring transient forces produced by the thrust producing assembly in the absence of any substantial net compliance incidental to force measurement.

Further, it is an object of this invention to provide a force measuring device particularly adapted and suited for accurately measuring transient forces or thrusts, in which a pair of piezoelectric members are disposed in stacked relationship, one of such members having an axis sensitive to dimensional changes therealong and having an electrical output proportional to such changes, and the other member having an electrical input for producing dimensional elongation along a particular axis thereof, the stated axes of the members being disposed in alignment and the input of the second member being connected to the output of the first member by suitable amplifier means whereby there is substantially no net dimensional change along the stated axes in response to a transient force or thrust applied therealong. In this fashion, the measuring device is characterized by the capability of making accurate measurements of transient forces or thrusts devoid of any debilitating inertia effects.

Other objects and advantages of the invention will appear from the description hereinbelow and the accompanying drawing wherein:

FIG. 1 is a view, partly diagrammatic, illustrating a force measuring system constructed in accordance with the principles of the present invention;

FIG. 2 is a sectional view taken through the force transmitting member or assembly shown in FIG. 1;

Figure 3B:
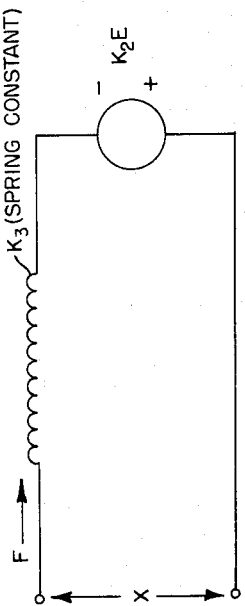
FIGS. 3a and 3b are, respectively, electrical and mechanical circuit models of a piezoelectric transducer such as is preferred in conjunction with the present invention.

With reference now more particularly to FIG. 1, the system according to the present invention will be seen to consist essentially of a thrust butt assembly as indicated generally by reference character 10 which is substantially rigid and immovable, being fixed to any suitable mounting base such as that indicated by the reference character 12. Suspended from the thrust butt 10 is a thrust producing assemblage indicated generally by the reference character 14, the mounting between the thrust butt and the assemblage 14 being such as to produce, as nearly as possible, a one degree of freedom system, as will be more clearly set forth hereinafter. Interposed between the assemblage 14 and the thrust butt 10 is a measuring device indicated by the reference character 16, which means 16 is characterized by its capability of measuring transient forces accurately without involving movement of the assemblage 14 for such purposes. To this end, the measuring means 16 is interposed between the assemblage 14 and the thrust butt 10, as will be more particularly pointed out hereinafter.

The force measuring means 16 has an output at 18 and an input at 20, both of which are connected to a summing device 22 which, in turn, has an output at 24 which is applied to an amplifying means 26 having its output at 28 connected to the input 20 of the measuring means 16. As will be described hereinafter in detail, the measuring means 16 comprises a generator means and a motor means, the former having the output 18 and the latter having the input 20 and the two being so constructed and arranged that the generator means senses the force applied by the assemblage 14 while the motor means counteracts such force to the end that although the force is measured, no net movement of the assemblage 14 is effected incidental thereto. In this fashion, measuring inaccuracies due to movement of the assemblage 14 and the inertia effects incidental thereto are obviated.

Thus, it will be manifest that the system according to the present invention involves a measuring device or means which has a high natural frequency which permits of precise measurement of transient forces. To illustrate the type of forces which the present invention is particularly well suited to treat, such forces may range, for example, between amplitudes of about one to about two hundred pounds and with durations measured in milliseconds, for example in the order of one hundred milliseconds or less.

With reference now more particularly to FIG. 2, it will be seen that the measuring means 16 shown therein includes a cylindrical casing 30 provided at one end thereof with a rigid mounting base or plate 32 which is rigid with and attached to the cylindrical portion 30 and which is provided with suitable means by which the mounting member 32 may be rigidly affixed to the thrust butt 10 shown in FIG. 1. The opposite end of the casing 30 is closed by a preloaded diaphragm member 36 which embraces and bears against a thrust reaction member 38 which may be provided with a tapped hole 40 whereby the reaction member 38 may be rigidly and securely fastened to the assemblage 14 shown in FIG. 1. Interposed between the member 38 and the plate 32 and held under slight compression therebetween by the flexible diaphragm 36 is the measuring cell assemblage indicated generally by the reference character 42. This assemblage 42 consists of a generator means 44, a motor means 46 and a plurality of isolating or insulating members 48, 50 and 52 substantially as is shown. Suitable conductors 54 and 56 connect the respective generator and motor means to the output jack member 58 and the input jack member 60 mounted in the casing 16 whereby the proper electrical connections, as hereinafter more particularly pointed out, can be easily and rapidly made. The operation of the device is such that the generator means 44 produces an electrical output at the jack 58 which is proportional to dimensional changes of the generator means along the axis 62 shown in FIG. 2 and the characteristics of the motor means 46 are that a signal applied to its input jack 60 produces a dimensional elongation along this same axis 62. Thus, the sensitive axes of the two means 44 and 46 are coincidental and are, further, coincidental with the axis of the suspension and force-applying characteristics of the assemblage 14 shown in FIG. 1.

In the particular embodiment shown in FIG. 1, the assembly 14 includes a platform 66 suspended by a plurality of suitable wires or the like 68 from the arm portion 70 of the thrust butt 10. Depending from the platform 66 is a suitable mounting bracket 72 to which is rigidly affixed a rocket nozzle assembly 74, it being noted that the suspension means 68 in cooperation with the orientation of the nozzle assembly 74, permits the thrust produced by the rocket device 74 to be applied along the sensitive axes of the generator and motor means previously described. Thus, the assemblage 14 is characterized by having one degree of freedom along an axis which is coincidental with the sensitive axes of the generator and motor means. Incidental to the operation of the rocket device 74, the platform may carry suitable fuel tanks 76 and a fuel pressurizing tank 78. In addition, the control for the rocket member 74 may include pressure and temperature sensitive instrumentation 80 and 82 and a suitable solenoid valve 84 controlling fuel or propellant flow. In the particular embodiment shown, the rocket device 74 contains a suitable catalyst bed and the fuel is hydrogen peroxide contained within the tank 76 and pressurized by suitable nitrogen tank source 78. However, it will be appreciated that a monopropellant system could equally as well be employed.

For the purpose of recording the data measured by the assemblage shown in FIG. 1, the input at 20 to the motor means, which is a direct indication of the thrust force applied, may be passed through suitable electronic circuitry 90 for display on an oscilloscope 92 and/or permanent recording device 94.

Figure 3D:
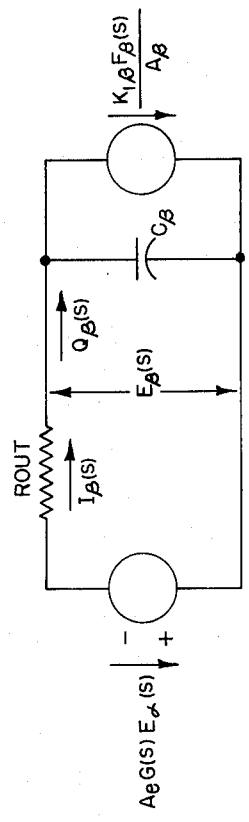
FIG. 3d is a model of the transducer driving circuit.
Figure 3A:
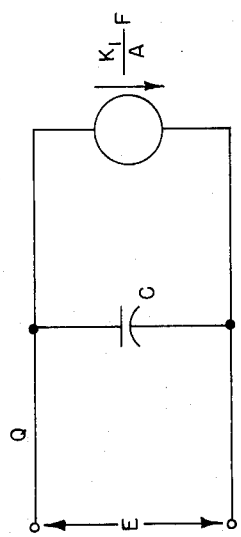

To the end of illustrating one practical embodiment of the present invention, reference will be had at this time more particularly to FIGS. 3a and 3b. FIG. 3a represents the electrical side of a piezoelectric transducer and it is preferred that such transducers be utilized for both the generator means and motor means previously described hereinabove. Considering first FIG. 3a, when a voltage is applied across the material, the total charge acquired is the sum of the charge causing a force to be developed and the charge acquired by the capacitance, as expressed by the following equation:

(1) $$Q = \frac{K_1}{A}F + CE$$

where $Q$ = total charge
$F$ = force
$A$ = cross sectional area of piezoelectric material
$K_1$ = material constant, mechanical-electrical coupling (coulombs per pound per square inch)
$C$ = capacitance of the material
$E$ = applied voltage.

Similarly, in conjunction with FIG. 3b, a change in length causes a voltage to be developed across the terminals. If a force is applied across the mechanical axis, tending to cause a change in length, two opposing forces are developed by the material. One force results from the material spring constant ($K_3$) and the other results from the piezoelectric force due to the voltage developed and these can be expressed as:

(2) $$F = K_3 x + K_2 K_3 E$$

where $x$ = change in length
$K_2$ = material constant, electromechanical coupling (inches per volt)
$K_3$ = material spring constant (pounds per inch)

Equation 2 is in more convenient form when solved for $x$, as follows:

(3) $$x = \frac{1}{K_3}F - K_2 E$$

Figure 4:
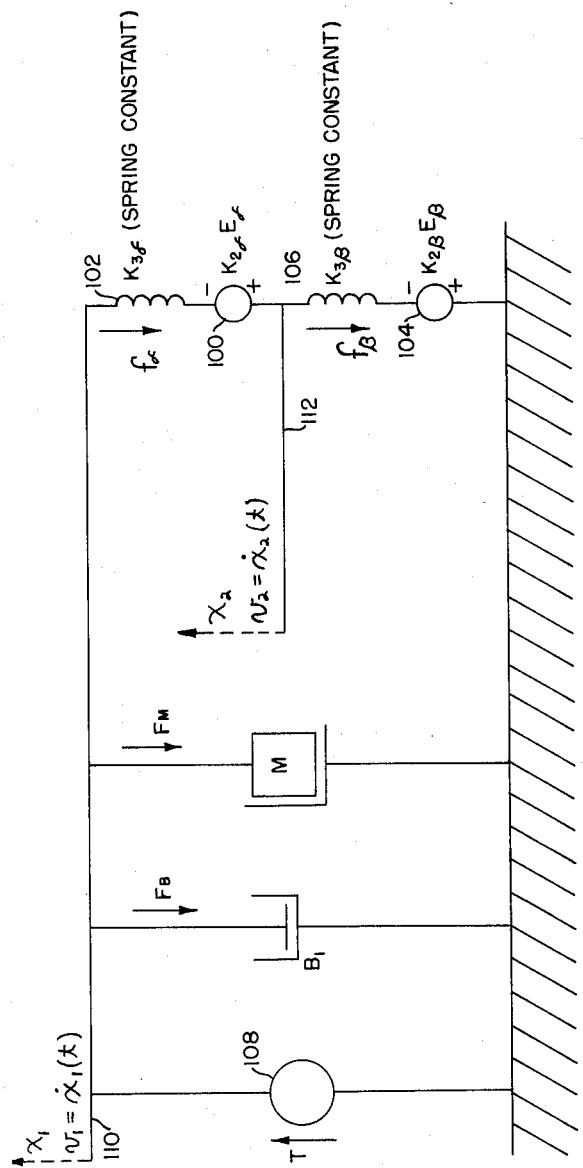
FIG. 4 is a mechanical network diagram for two piezoelectric systems in series.

With reference now to FIG. 4, the network shown therein illustrates two piezoelectric crystals connected in series as is shown, for example, in FIG. 2 of the drawing. In FIG. 4, the generator means is indicated by the subscript $\alpha$ and will be seen to include the voltage generator 100, the spring constant 102 whereas the motor means is designated by the subscript $\beta$ and will be seen to include the voltage generator 104 and spring constant 106. The thrust T imposed upon the system and as is diagrammatically illustrated at 108, is opposed by the force $F_{B_1}$ which represents the viscous damping which may appear cross the system, the force $F_{M_1}$ which represents the mass damping which may be across the system and the force $F_\alpha$ due to the transducer $\alpha$. The above holds true for the force equation for the junction 110. For the junction 112, it will be seen that the forces of the two transducers $\alpha$ and $\beta$ are equal to each other. That is to say, the force equations at the $X_1$ and $X_2$ terminals respectively are:

(4) $$T - F_{B_1} - F_{M_1} - F_\alpha = 0$$

(5) $$F_\alpha - F_\beta = 0$$

Equations 4 and 5 may be rewritten as follows:

(6) $$T(s) - [B_1 s + M_1 s^2]X_1(s) - F_\alpha(s) = 0$$

or $$X_1(s) = \frac{T(s) - F_\alpha(s)}{M_1 s^2 + B_1 s}$$

(7) $$F(s) = F(s)$$

where $s$ denotes the differential operator.

Since, from Equation 3:

$$X = \frac{1}{K_3}F - K_2 E$$

and, from Equation 2:

$$F = F_3 X + K_2 K_3 E$$

then $$F_\alpha = K_{3\alpha} X_\alpha + K_{2\alpha} K_{3\alpha} E_\alpha$$

and $$F_\beta = K_{3\beta} X_\beta + K_{2\beta} K_{3\beta} E_\beta$$

and since $X_\alpha = X_1 - X_2$ and $X_\beta = X_2$, (8) $$F_\alpha = K_{3\alpha}(X_1 - X_2) + K_{2\alpha} K_{3\alpha} E_\alpha$$

and (9) $$F_\beta = K_{3\beta} X_2 + K_{2\beta} K_{3\beta} E_\beta$$

and, from Equation 3:

(10) $$X_2 = \frac{1}{K_{3\beta}}(F_\alpha - K_{2\beta} E_\beta)$$

Figure 3C:
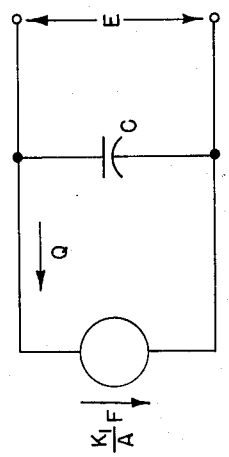
FIG. 3c is a circuit model illustrating the voltage developed across a piezoelectric transducer in response to stress applied thereto.

With reference now to FIG. 3(c), when a stress is applied across a transducer, the voltage developed results from the internal charge, $$\frac{K_1}{A}F$$

accumulating on the capacitance C. The polarity of the voltage developed (from this charge) is such that if a voltage having this polarity were applied, a force would be generated to oppose the applied force. This is illustrated in FIG. 3(c). Thus, using the notation from FIG. 3(c):

(11) $$E = \frac{-K_1}{AC} F$$

Similarly, an expression for $E_\beta$ in terms of $E_\beta$ and $F_\beta$ can be obtained from the transducer driving circuit as shown in FIG. 3(d).

Taking the sum of the voltage drops around the first loop:

$$A_e G(s) E_\alpha(s) + I_\beta(s) R_{out} + E_\beta(s) = 0$$

and, from Equation 1:

$$Q_\beta(s) = \frac{K_{1\beta}}{A_\beta} F_\beta(s) + C_\beta E_\beta(s) = \frac{I_\beta(s)}{s}$$

Then substituting for $I_\beta(s)$ in the voltage drop equation:

$$A_e G(s) E_\alpha(s) + \left[\frac{K_{1\beta}}{A_\beta} s F_\beta(s) + C_\beta s E_\beta(s)\right] R_{out} + E_\beta(s) = 0$$

from which:

(12) $$E_\beta(s) = \frac{-A_e G(s) E_\alpha(s)}{C_\beta R_{out} s + 1} - \frac{\frac{K_{1\beta} R_{out}}{A_\beta} s F_\beta(s)}{C_\beta R_{out} s + 1}$$

Figure 5:
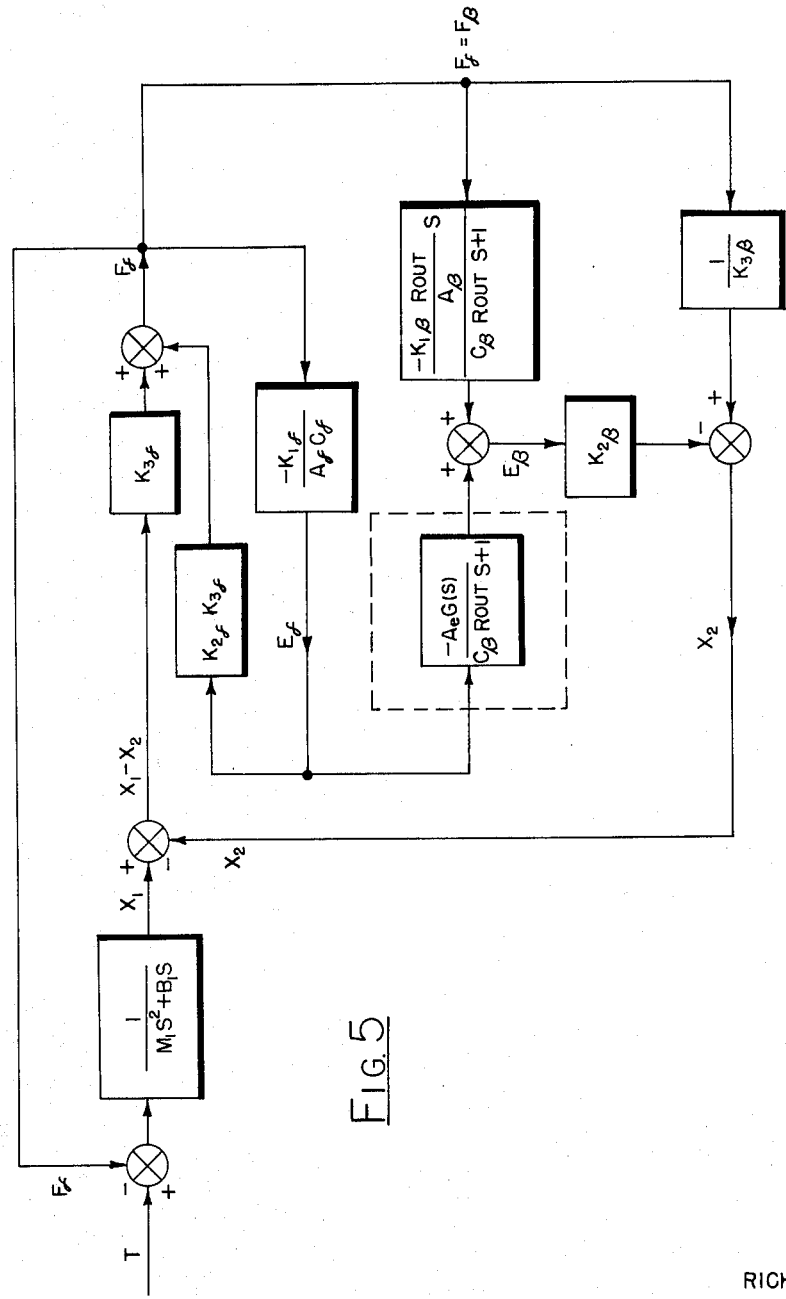
FIG. 5 is a block diagram of a system such as is shown in the network of FIG. 4.
Figure 6:
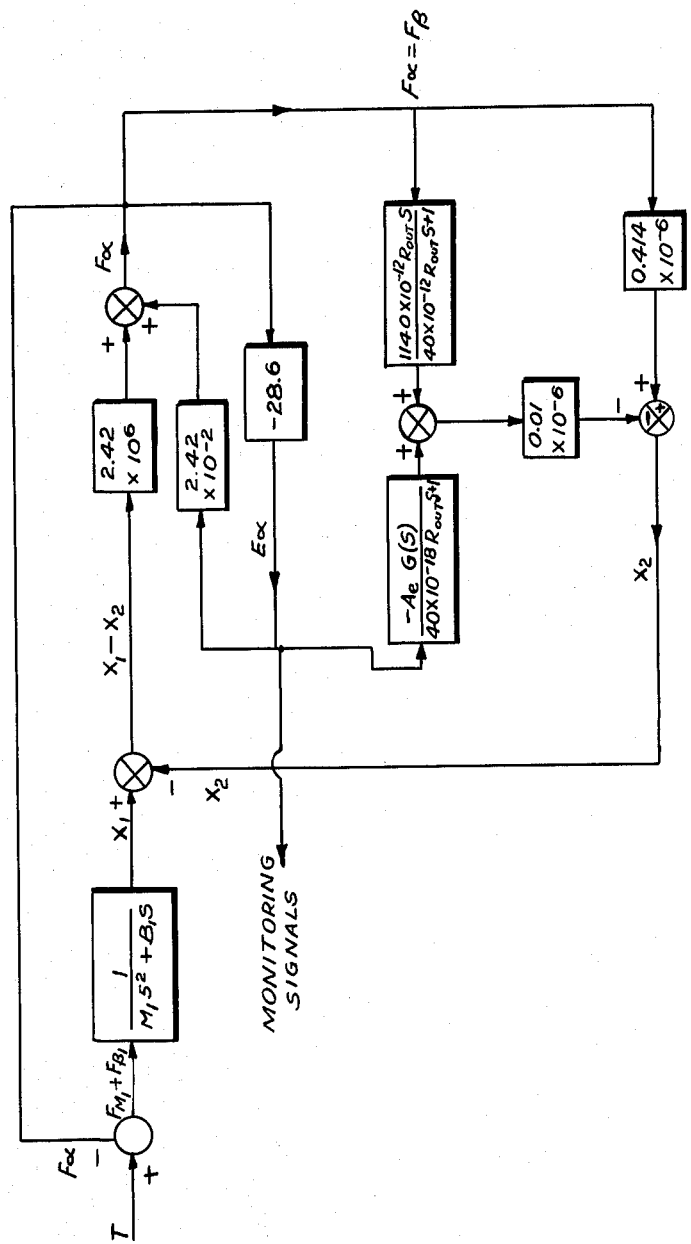
FIG. 6 is a view similar to FIG. 5 but illustrating values associated with a particular embodiment of the invention.

Using Equations 8, 9, 10, 11 and 12, the block diagram according to FIG. 5 may be constructed. Considering FIGS. 5 and 6 simultaneously, and in order to obtain a better understanding of the operation of the present invention, a specific example according to FIG. 6 is submitted. In the case of FIG. 6, both the generator and motor means are identical cylinders measuring ⅜ of an inch in diameter by ¾ of an inch in length constructed of PZT–4 (lead titanate zirconate) having the following specifications:

$$K_1 = 126 \times 10^{-12} \text{ coulomb/p.s.i.}$$
$$K_2 = 0.01 \times 10^{-6} \text{ inch/volt}$$
$$K_3 = 2.42 \times 10^{+6} \text{ lb./inch}$$
$$A = 0.11 \text{ sq. inch}$$
$$C = 40 \text{ mmfd.}$$

Figure 7:
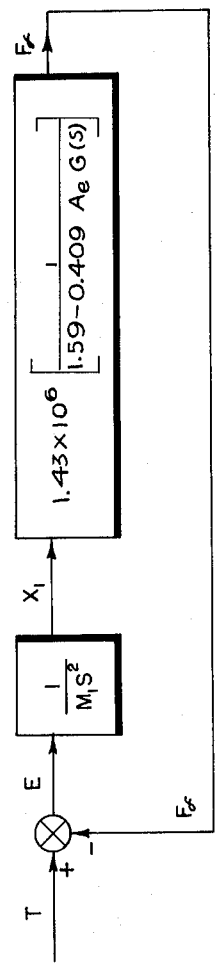
FIG. 7 is a simplified block diagram of the system shown in FIG. 6.

These constants can be substituted directly into the block diagram of FIG. 6 from corresponding expressions in FIG. 5. Although direct analysis of the system of FIG. 6 becomes quite involved for manual calculation because of the number of summing junctions, computer analysis may be readily accomplished. For manual calculation, a fairly accurate analysis of the system can be achieved by making certain practical assumptions. For example, the viscous damping across the system, $B_1$, and the driving source output impedance, $R_{out}$, may be assumed to be zero and, as well, $M_2$ and $B_2$ may be considered to be zero. With these assumptions, the block diagram of FIG. 6 reduces to the simplified form shown in FIG. 7. It can also be shown that FIG. 7 is applicable to both the series arrangement of piezoelectric crystals as is shown in the specific embodiments herein and for a pair of piezoelectric crystal elements disposed in parallel relationship.

It is to be understood that certain changes and modifications as illustrated and described may be made without departing from the spirit of the invention or the scope of the following claims.

I claim:

1. In a force measuring system,
   a rigid and substantially immovable thrust butt,
   a thrust-producing assembly,
   suspension means mounting said assembly from said butt for substantially rectilinear movement relative thereto along a predetermined axis,
   measuring means disposed between and bearing against both said butt and said thrust-producing assembly,
   said measuring means comprising a generator element and a motor element disposed in stacked relation, said generator element having an axis sensitive to dimensional changes therealong to produce an electrical output proportional to such dimensional changes, said motor element having an electrical input for producing dimensional elongation along an axis of the motor element, said generator and motor elements being positioned with the stated axes thereof in alignment with each other and in coincidence with the aforesaid predetermined axis established by said suspension means, and circuit means connecting the output of said generator element to the input of said motor element whereby the magnitude of said electrical output is proportional to the magnitude of thrust force applied to said measuring means by said thrust-producing assembly.

2. In the system as defined in claim 1 wherein said generator element and said motor element are constructed of piezoelectric material.

3. In the system as defined in claim 1 wherein said circuit means comprises a summing device connected to the output of said generator element and to the input of said motor element and having an output indicative of the difference therebetween, and amplifier means connecting the output of said summing device to the input of said motor element.

4. In a force measuring system, in combination,
   a rigid and substantially immovable thrust butt,
   a thrust-producing assembly,
   suspension means mounting said thrust-producing assembly from said butt for substantially rectilinear movement along a predetermined path toward said butt,
   measuring means disposed within said predetermined path between said butt and said thrust-producing assembly, said measuring means comprising a generator mechanism and a motor mechanism, said generator mechanism having an axis extending along the direction of said predetermined path which is sensitive to dimensional compression therealong to produce an electrical output proportional to such dimensional compression, said motor mechanism having an electrical input for producing dimensional elongation along an axis of the motor mechanism, said axis of the motor mechanism also extending along the direction of said predetermined path, and circuit means connecting the output of said generator mechanism to the input of said motor mechanism whereby the magnitude of said electrical output is proportional to the magnitude of thrust force applied to said measuring means by said thrust producing assembly.

5. In the system according to claim 4 wherein said generator and motor mechanisms are constructed of piezoelectric material.

References Cited by the Examiner
UNITED STATES PATENTS

| | | | |
|---|---|---|---|
| 1,902,184 | 3/1933 | Rieber | 73—71.4 X |
| 3,122,917 | 3/1964 | Ormond | 73—116 |

FOREIGN PATENTS 763,226  12/1956  Great Britain.

OTHER REFERENCES

L. E. Bollinger: "Design and Performance of a Thrust Transducer," ISA Journal, August 1956, pages 260–264.

RICHARD C. QUEISSER, *Primary Examiner.*

C. A. RUEHL, *Assistant Examiner.*